United States Patent
Reitz, Jr.

[15] 3,698,806
[45] Oct. 17, 1972

[54] PAN SCAN SYSTEM

[72] Inventor: Lewis P. Reitz, Jr., Palos Verdes Estates, Calif.

[73] Assignee: Technicolor, Inc., Hollywood, Calif.

[22] Filed: Aug. 20, 1970

[21] Appl. No.: 65,510

[52] U.S. Cl. ..................355/40, 352/85, 352/91, 355/42, 355/64
[51] Int. Cl. ..................................G03b 27/52
[58] Field of Search .........355/40, 42, 64; 352/85, 91

[56] References Cited

UNITED STATES PATENTS

3,199,404   8/1965   Bragg et al...................355/42
3,377,914   4/1968   Jeffee..........................355/41

Primary Examiner—Samuel S. Matthews
Assistant Examiner—Richard A. Wintercorn
Attorney—Lyon & Lyon

[57] ABSTRACT

An automatic control system for changing aspect ratio in the reproduction of motion pictures, wherein the recorded images are in accordance with an anamorphic or other wide screen process, and the desired reproduction thereof is of standard size or of a different aspect ratio. A typical example is the conversion of images from movie film of one aspect ratio to images on film, video tape or the like of aspect ratio suitable for television usage. Portions of the original images are selected, and a program tape is recorded in accordance with this selection. A servo system responsive to the tape controls the reproduction, such as by a film printer. Signals from the tape are used to control the selection of the portions of original film frames and indicate a start position and an end position of the scan of the original, as well as indicate the frame length of the scan. A film gate or other device of a film printer, for example, is operated by the servo system, and is moved from position to position to select and allow exposure of the preselected portions of the original film for printing.

18 Claims, 11 Drawing Figures

PAN SCAN SYSTEM

This invention relates to the conversion of recorded images from one aspect ratio to another and more particularly to a servo system for rapidly and accurately accomplishing this objective.

There are various techniques used in the art of printing pictures, including stills and motion pictures, such as contact printing, enlarging, scanning, and so forth. While not limited to this particular application, the concepts of the present invention will be discussed in the environment of producing from a motion picture film, which is recorded in accordance with an anamorphic or other wide screen process, a recording such as by motion picture film of different aspect ratio suitable for television usage. As is known, production of the resultant film raises the problem of selecting the limited portion of the original which best conveys the action and dramatic values of the original. Various techniques have been proposed and used in the past for accomplishing this objective, but these have generally been relatively complex and cumbersome electromechanical type systems employing complex mechanical linkages and the like along with relay control system and so forth.

Prints for television from anamorphic negatives have been made from scanned internegatives made from interpositives. A printer was developed to pan and scan directly to color positive from the original negative at the same time that other effects were added. This equipment has been used for making reversal internegatives. Since equipment of this nature employs illumination optics and a relatively long de-anamorphising lens, it is believed desirable for the copy lens to be left on the optical axis of the printer bed and to move the receiving head back and forth to accomplish scanning. For printing with a wet process (wherein the original film is wetted), it is necessary to scan on the fly; that is, without stopping the printer. Therefore, the film movement, or gate, through which the unexposed film advances is swung within the positive head, or camera, in order to accomplish the pan and scan of the original film. In order to accomplish the desired panning and scanning, film movement may shift as much as one inch back and forth to enable a selection of the desired portion of the film for printing.

In accordance with an exemplary embodiment of a system according to the present invention, the printing head or gate may be caused to assume any one of seven scanning positions, or may be moved linearly for panning the original scene. That is, for example, the film gate can be moved in a step-by-step fashion to select any one of seven portions of the original scene. These steps may occur for any desired length of film, such as from frame to frame up to many feet of film. Furthermore, the film gate may be moved slowly or linearly, rather than step-by-step, in selecting the desired portions of the original scene from one frame to the next or from one frame to any desired subsequent frame. Thus, panning can be accomplished from any one to any other of the seven positions in any number of feet of film as desired, such as from 1 foot to 100 feet.

In using the present system, the original film first is viewed and a paper tape is punched in accordance with the desired portions to be printed of the various frames of the original film. The present system employs the tape to automatically and repetitively select a limited portion of the width of the original scene for printing thereof through control of the printing film gate, optical system or other manner of recording such as through video recording. In an exemplary embodiment of the present concepts, a servo amplifier is controlled to drive a motor which operates the film gate back and forth linearly or step-by-step to any one of seven positions. The positioning of the shaft of the motor is controlled by a voltage applied to the input of the servo amplifier. A linear change in this input voltage results in a linear shift in the film movement and gives a slow pan, or a step change results in a step-by-step change in film movement and accordingly a step-by-step change in the positions selected for printing. The servo system is capable of driving the film gate from one extreme position to the other extreme position in a relatively short period of time even at rapid printing speeds to permit repositioning of the gate within the shutter dark period between frame exposures.

The signals applied to the servo amplifier are derived by decoding information contained on the punched paper tape, the information occurring in blocks. Contained in these blocks, for example, are two rows of eight binary bits each to designate the predetermined frame number where the action is taking place. Another row containing six bits is used to designate (with three bits) the new position number (one to seven) of the gate and to designate (with three bits) the final position number (one to seven) of the gate if it is desired to pan from one position to another. Finally, two rows containing a total of 12 binary bits are used which contain the length of the pan in feet and frames, from 1 to 100 feet. A row with eight bits indicate pan length in feet and another row with four bits indicates the pan length in frames.

The paper tape is prepared on an editing table at which a film negative, or a positive print, can be inspected. The frame count is electrically counted for tape punching. The initial scan position, final scan position, and pan length are selected on a keyboard by the operator for programming the tape as desired in a conventional manner well known to those skilled in the art.

At the printer, this tape is inserted into a tape reader which reads the above information; that is, the frame number, next scene values and the pan length. An electronic frame counter actuated by a photo chopper on the printer negative shaft keeps track of the frame count, and the count from this circuit is continuously compared with the frame number from the paper tape. At coincidence, the scan positions are decoded and stored, and a previously stored new scan start position is applied as an initial condition input to an integration amplifier which provides an output to the servo amplifier. The difference between the scan start position and the scan end position also is derived, and is varied as a function of the decoded pan length information and used as an input integrating voltage to the integrator. This creates an output ramp voltage which is applied to the servo amplifier, this voltage having been adjusted in magnitude by the distance to be panned (position to position), the pan length and the printer speed. This output voltage also is compared to the end scan position, and when these become equal the input integrating voltage is terminated and the integration stops. Stated another way, the output voltage ramp ceases to change, and it remains at the voltage corresponding to the end scan position thereby indicating that the pan period has concluded. The system remains in this state until another command is received from the tape. As will appear, step panning rather than smooth panning can be readily accomplished, and this eliminates the smear caused by the continuous motion of film gate during printing of a frame.

Accordingly, it is a principal object of this invention to provide a novel system for use in automatically and repetitively selecting a limited portion of the width of the scene for reproduction.

Another object of this invention is to provide a novel servo system for use in conversion of wide screen type motion picture film to an aspect ration compatible for television usage.

A further object of this invention is to provide a panning and scanning electronic system capable of a smooth or a step panning operation.

These and other objects and features of the present invention will become better understood through a consideration of the following description taken in conjunction with the drawings in which.

Figures 1A, 1C:
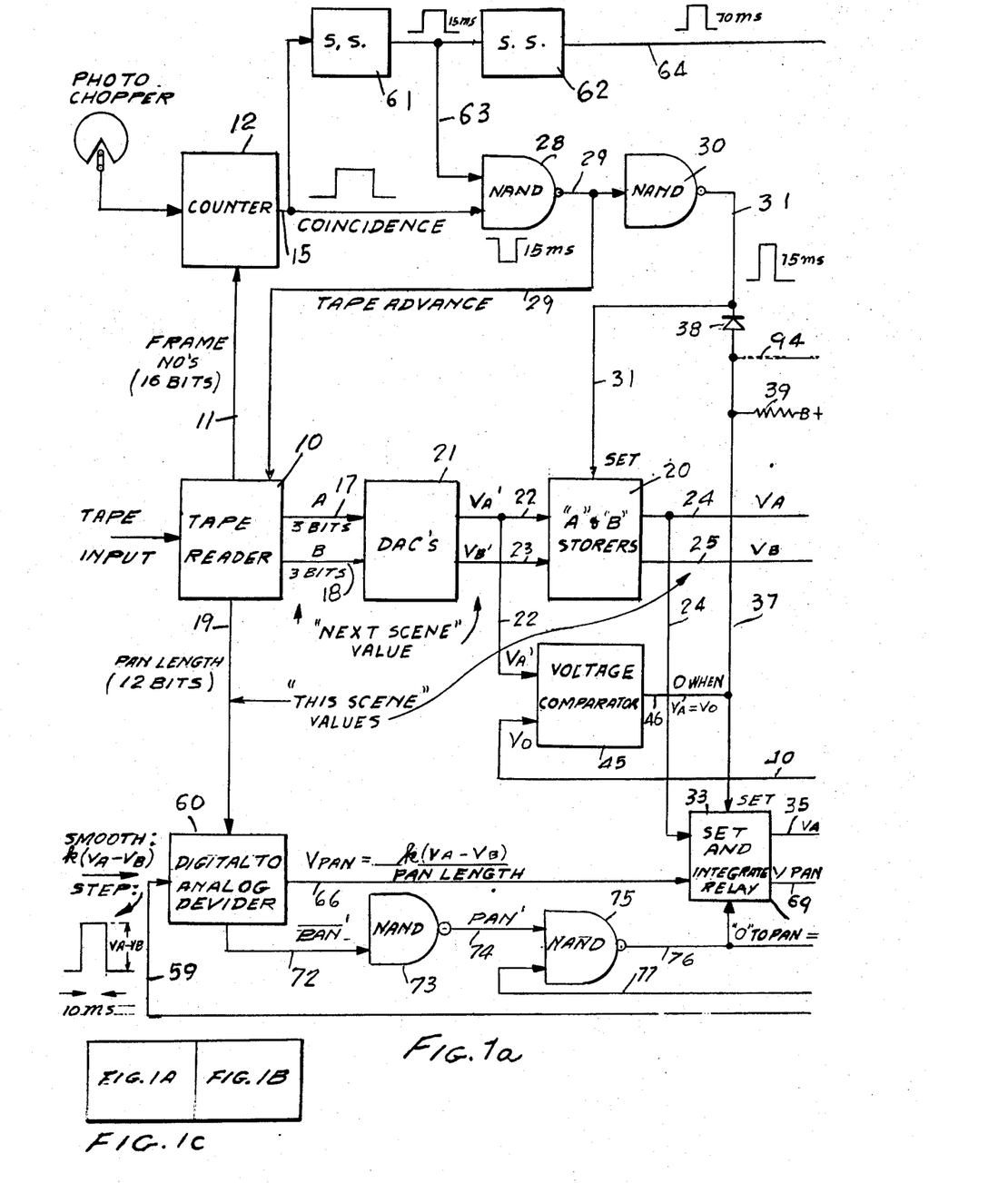
FIGS. 1a and 1b, arranged as indicated in FIG. 1c, are a block diagram of an exemplary system in accordance with the teachings of the present invention.
Figure 1B:
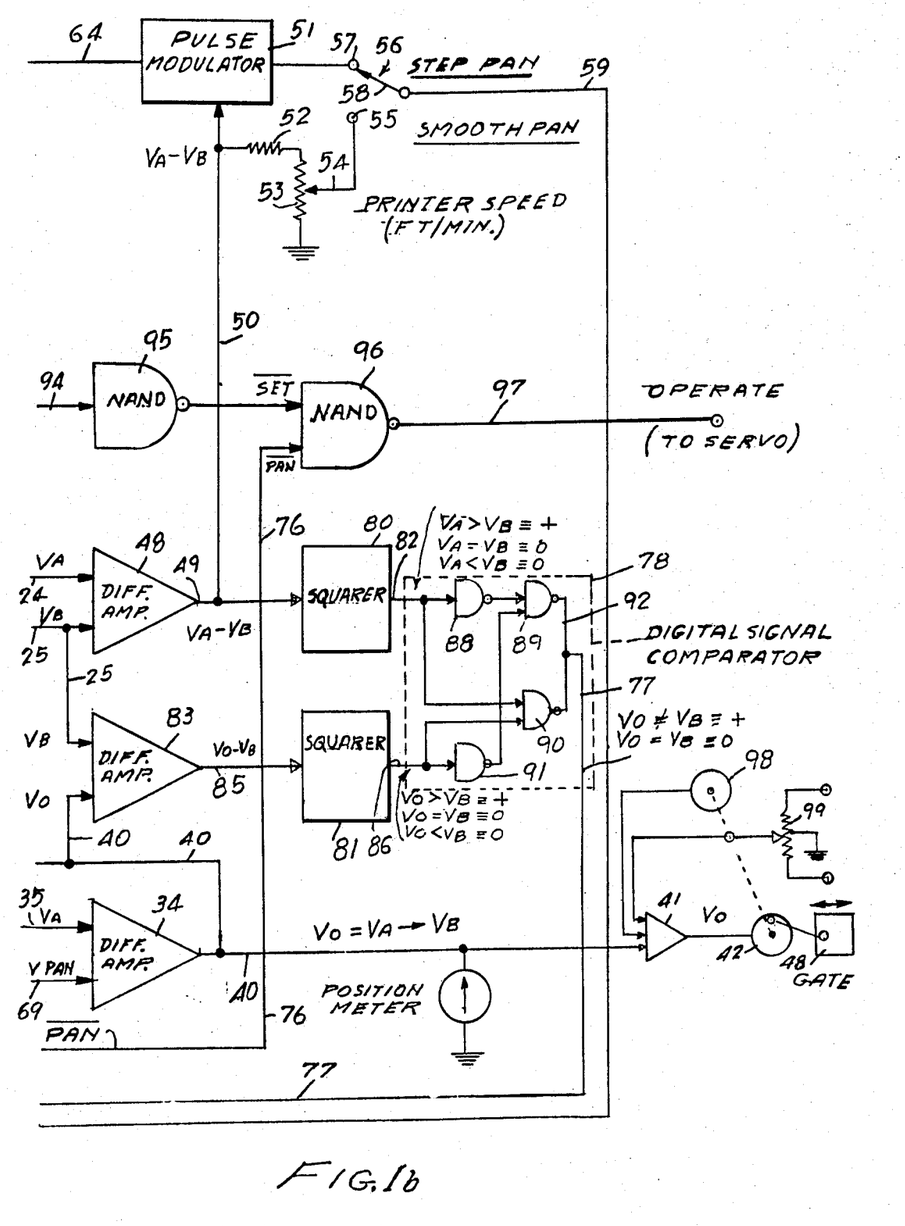

Turning now to the system of FIGS. 1a and 1b, the same illustrate, basically, a system including (1) a tape reader for reading the aforementioned information from punched tape coupled with (2) a frame counter for counting film frames to provide signals interpreted and operated upon by (3) digital and analog circuitry for operating (4) a servo motor which in turn controls the selection of the portions of film frames to be reproduced, as by operating a movable film gate. More specifically, a block tape reader 10 of conventional form is employed to read the blocks of information previously recorded on the tape. The tape reader 10 is coupled by a line 11 with a predetermined distance counter, or electronic frame counter, 12 of conventional construction. The counter 12 is controlled by an input 13 which may be from a photo chopper 14, which is synchronized with film movement to provide a count signal for each frame. The counter 12 provides an output on a line 15 indicative of coincidence between when the actual frame count and the frame count from the tape become the same. The tape reader 10 provides output A bits and B bits on respective lines 17 and 18 indicating the beginning and ending positions of the film gate for the scan operation during a scene. At any given time, these signals indicate the next scene positions or values, inasmuch as the positions for the scene currently being printed previously have been stored as will be explained subsequently. The tape reader 10 also provides an output on a line 19 indicating the pan length; that is, the number of frames or feet of film over which the scan from one position to another is to occur.

The three bit digital information on each of lines 17 and 18 are applied to digital to analog converters 21 which in turn provide analog voltage outputs $V_a'$ and $V_b'$ on respective lines 22 and 23 indicative of the start and end gate positions. These lines are coupled with A and B storage circuits 20 to store these analog voltages representative of the gate start and end positions and are available on respective output lines 24 and 25 and designated as voltages $V_a$ and $V_b$.

Turning again to the counter 12, a coincidence output pulse is applied on the output line 15 thereof and is supplied to a nand gate 28 which is gated to provide an output on a line 29 to cause the tape reader to advance. The output on the line 29 is applied to a nand gate 30 which has an output connected by a line 31 to a set input of the storage circuits 20. In this manner, upon coincidence between the actual frame count and frame count read from the tape reader 10, the gate or scan positions are decoded to analog voltages by the digital to analog converters 21 and stored in the A and B storage circuits 20. At the same time that this information is stored in the circuits 20, the new start position $V_a$ previously stored is supplied by the line 24 through a set and integrate relay 33 to an input of an integrator 34 (FIG. 1b) by means of line 35. This is essentially an initial condition input to the integrator which establishes the starting point for integration as will become better understood through a consideration of the ensuing description. The relay 33 is set by a signal applied by a line 37 which is coupled from the output of the nand gate 30 through an isolating diode 38 to the input of the set relay 33. The line 37 is connected to a bias source through a resistance 39. As will appear subsequently, the tape may be used in the tape reader so that the blocks of information are staggered with respect to the manner in which they are originally punched, such as by two lines or rows of a block to allow reading of the frame number, storing of the next scene positions, and moving of the tape to a next block position while still reading the pan length of the original block in real time.

The output of the integrator 34 is applied on a line 40 to a servo amplifier 41 which in turn is connected to a reversible servo motor 42. The servo motor 42 is connected to a film gate 43 to move the same back and forth so as to select the portions of the original film to be printed. The output of the amplifier 41 could be coupled to means other than a mechanical film gate for enabling aspect ratio change. The output of the integrator 34 also is applied on the line 40 to a voltage comparator 45 (FIG. 1a). This circuit 45 receives an input $V_a'$ from the line 22 indicative of the start position of the next scene, and provides an output on a line 46 which is coupled through the line 37 to the set input of the set relay 33. The isolating diode 38 prevents the set relay 33 from setting if the output of the voltage comparator 45 is zero, but still allows the A and B storage circuits 20 to be set from the nand gate 30. The output from the stretcher 45 prevents resetting of the set relay 33 if the final scan position for the current scene is the same as the start scan position for the the next succeeding scene. That is, the stretcher circuit 45 prevents the film gate from being moved in the case where the next succeeding start position is the same as the final position of the scene being completed.

The start and end scan positions, indicated by the analog voltages $V_a$ and $V_b$ on respective lines 24 and 25, are applied to the input of a differential amplifier 48 (FIG. 1b) which provides a signal on a line 49 which is the difference between these values, i.e., $V_a - V_b$. This signal is applied on a line 50 to a pulse modulator 51 for achieving a step pan action, and to a resistor 52 and potentiometer 53 for enabling a smooth pan action. A movable tap 54 of the potentiometer 53 is connected to one contact 55 of a switch 56, and the output of the pulse modulator 51 is connected to another contact 57. A movable contact 58 of the switch 56 is connected to a line 59 which in turn is connected to an input of a digital to analog divider 60 (FIG. 1a). When the switch 56 is in the lower position, a smooth panning action can be accomplished wherein the film gate moves smoothly from one position to another, that is, from $V_a$ position to $V_b$ position. The arm 54 of the potentiometer 53 is adjusted according to the speed of the film printer. When the switch 56 is in the upper position, the signal $V_a - V_b$ is modulated so as to provide step voltages to step the film gate from one position to the next. The input to the pulse modulator 51 is from a single shot circuit 62 triggered from a single shot circuit 61. The circuit 61 also provides a gate input on a line 63 to the nand gate 28. The single circuits 61 and 62 provide an output signal on the line 64 coupled to the input of the modulator 51, which may be, for example, a 10 millisecond pulse to indicate that the shutter of the printer film gate is closed so that the film gate is step panned to the next position during closure of the shutter, rather than being moved while the shutter is open and thus causing a blur in the resulting print.

Turning now to the digital to analog divider 60 in FIG. 1a which receives the smooth pan or step pan signal on the line 59 and the pan length signal 19 from the tape reader 10, the same provides an output signal on a line 66 which is the signal ultimately integrated by the integrator 34 (FIG. 1b). The signal on the output line 66 is essentially the signal on the input line 59 divided by the pan length signal on the input line 19 and, thus, $$V_{pan} = \frac{k(V_a - V_b)}{\text{pan length}}$$

This signal is applied through the set and integrate relay 33 and a line 69 to the integrate input of the integrator 34. The relay 33 essentially is operated by a signal indicating when panning should occur. For this purpose, a signal is provided by the divider 60 on a line 72 to a nand gate 73, the output of which is coupled by a line 74 to an input of a nand gate 75. The output of the nand gate 75 is applied by a line 76 to operate the relay 33 in gating the integrated signal from input line 66 to output line 69; whereas, the set input to the relay 33 gates the initial condition voltage $V_a$ from line 24 to line 35. Another input to the nand gate 75 is provided on a line 77 from a digital signal comparator 78 which receives inputs from squarer circuits 80 and 81.

Turning for the moment to these circuits, the output of the differential amplifier 48 is coupled to the squarer circuit 80 which provides a standard magnitude output signal proportional to $V_a - V_b$ on an output line 82. Similarly, a differential amplifier 83, which receives a $V_b$ input (end of scan position) and a $V_o$ input (present scan position), provides a difference output signal $V_o - V_b$ on a line 85 which is applied to the squarer 81. The squarer 81 provides a standard magnitude voltage proportional to $V_o - V_b$ on an output line 86. The digital signal comparator 78 comprises a series of interconnected nand gates 88 through 91 to provide output signals as described below. The line 82 is connected to the nand gate 88 and to the nand gate 90. The line 86 is connected to the nand gate 91 and to the nand gate 90. The output of the nand gate 88 is connected as a second input to the nand gate 89 which has an output on a line 92 coupled with the comparator output line 77. Also, the output of the nand gate 90 is connected to the line 92. The line 82 from the squarer 80 provides positive signals when $V_a$ is greater than $V_b$, and zero signals when $V_a$ is equal to $V_b$ or $V_b$ is greater than $V_a$. The line 86 from the squarer 81 provides a positive output when $V_o$ is greater than $V_b$, and provides a zero output when $V_o$ is equal to $V_b$ or $V_b$ is greater than $V_0$. The line 77 provides a positive output when $V_o$ is not equal to $V_b$, and a zero output when $V_o$ is equal to $V_b$. As will be apparent, when $V_o$ becomes equal to $V_b$, the scan has reached the end scan position. The nand gate 75 in FIG. 1a which controls gating of the integrand signal thus receives a pan input on the line 74 and a signal on the line 77 to provide a control signal to the relay 33 which allows the integrand on the line 66 to be integrated or not by the integrator 34 as is necessary in accomplishing the proper panning and scanning operations.

The line 37 coupled to the set input of the set relay 33 (FIG. 1a) also is connected to a line 94 which is connected through a nand circuit 95 (FIG. 1b) to a not-set input of a nand circuit 96. The nand circuit 96 also receives the signal on the line 76 from the nand gate 75 which controls integration. The nand gate 96 preferably includes a pulse stretcher to provide a suitable length output signal on a line 97. When this signal is zero, it can provide a control signal enabling a panning action to, for example, release a brake on the motor 42 and/or gate power to the motor; and when a signal exists on the line 97, the brake is operated to insure that the gate remains in a fixed position.

The motor 42 may be a conventional servo motor, and in the case of a relatively heavy film gate, may for example have a peak output of 1½ horsepower. The shaft of the motor is coupled to a tachometer 98 and to a movable arm of a potentiometer 98 coupled with a reference voltage supply in a conventional manner. The output of the tachometer and signal from the movable arm of the potentiometer are coupled as inputs to the servo amplifier 41. The potentiometer 99 preferably is a precision potentiometer serving as a follow-up potentiometer for accurate positioning of the motor 42. The tachometer 98 is used in a conventional manner to dampen the system. In a typical application, the motor 42 is coupled through a crank arrangement to operate the gate 43. In this case, the potentiometer 99 may be nonlinear in order to compensate for nonlinearity of the crank arrangement. In a typical application of the present system operating a movable film gate, the gate can be driven between its extreme positions in a maximum of 50 milliseconds with printing speeds up to 30 or 40 feet of film per minute. This allows repositioning of the gate within the shutter dark period between frame exposures even at such speeds, although slower printing speeds such as approximately 18 or 26 feet per minute are more typical.

Figure 2:
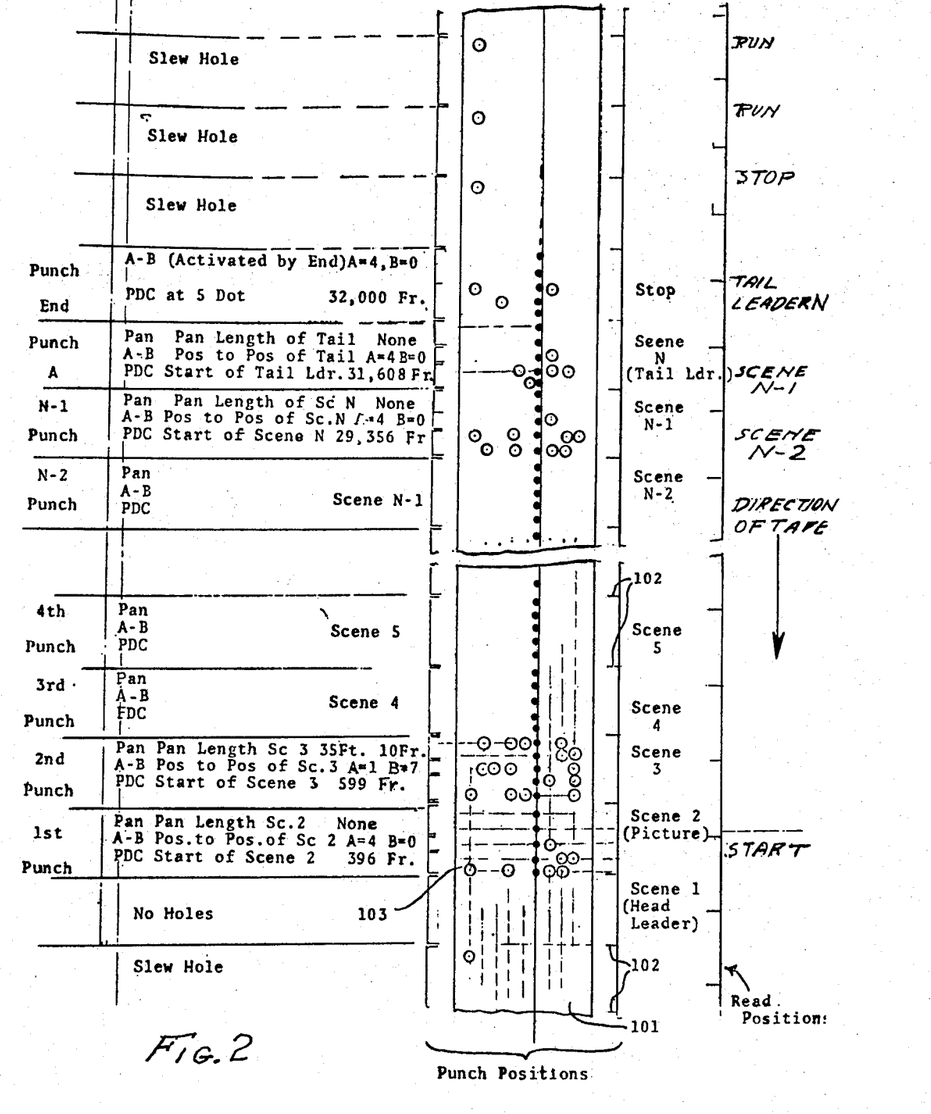
FIG. 2 is a diagram of an exemplary tape format which may be employed in conjunction with the system of FIG. 1.

In order to ensure a more complete understanding of an exemplary embodiment of a servo system according to the present invention, additional details are set forth below of a suitable tape format and construction of the various circuits which may be used. The tape format typically may be as illustrated in FIG. 2 which is believed to be self-explanatory to those skilled in the art. The tape 101 is conventional punched paper tape which may be punched with blocks of information as described earlier and indicated by lines 102. Each block represents the information for one scene and comprises, for example, five rows or lines of eight bits each. Starting at a line indicated by reference numeral 103, this line and the second line may have a number of bits indicating the pan start position in frames, such as up to 9,999 frames. These two lines are punched under control of a frame counter when the tape is made up. The third line includes the A and B bits indicating the start and end positions (1–7) of the scan and may include two groups of three bits. The fourth line may indicate pan length in feet times 10, and the fifth line may indicate pan length in feet and frames. In this manner, the actual frame start position for each scene is punched in the first two lines under control of the frame counter, and the scan positions and pan length are punched in lines three to five by the operator. The tape shown in FIG. 2 illustrates an exemplary example of a tape which has been punched for use with the present system.

Figure 3:
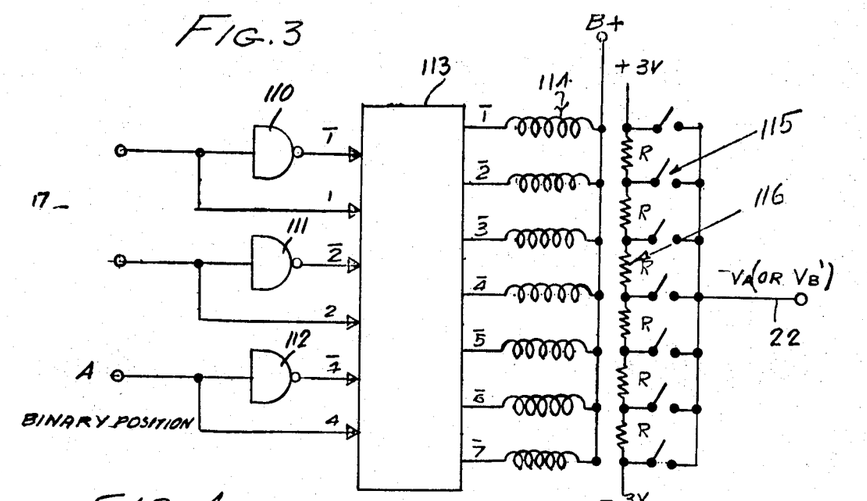
FIG. 3 is a diagram of a digital to analog converter employed in the system of FIG. 1.

Turning now to exemplary circuits, FIG. 3 is a diagram of a digital to analog converter which may be employed in the digital to analog converters 21 in FIG. 1a. A circuit as in FIG. 3 is used for each of the three A and B bits supplied by the tape reader 10. It includes a series of input nand gates 110 through 112 coupled with a digital to analog readout matrix 113. The nand gates may be S8NG gates manufactured by Digital Products of San Pedro, California, and the matrix 113 may be their model S1RM matrix. The input bits are applied through the nand gates and the matrix to energize relay windings 114 which in turn operate switches 115 to select resistors of a resistive divider 116. The resistive divider in turn provides an output analog voltage proportional to the input digital signals. Typically the output voltage may have a magnitude of 1 volt per scan position.

Figures 4, 5:
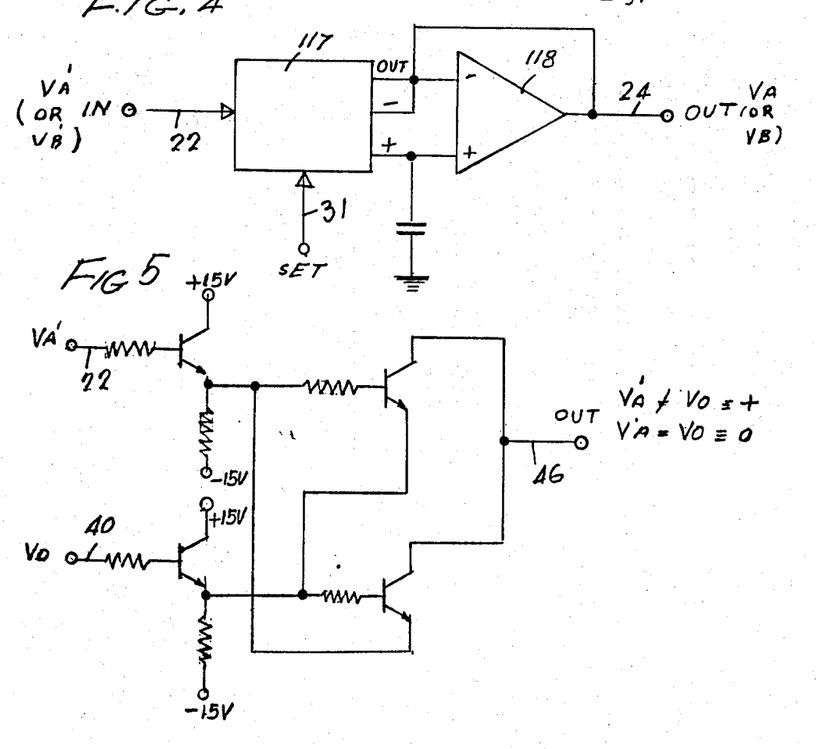
FIG. 4 is a diagram of a storage circuit employed in the system of FIG. 1.
FIG. 5 is a diagram of a voltage comparator employed in the system of FIG. 1.

FIG. 4 is a circuit diagram of one of the A and B storage circuits 20. This circuit is an analog storage circuit for storing a scan position analog voltage during a scene. It includes a track and hold module 117 manufactured by Philbrick-Nexus, of Dedham, Massachusetts, and a minimum drift operational amplifier 118, such as PP25 AU manufactured by the same company. This circuit serves to store the analog voltage input thereto when it is set and to make available the stored voltage at the output line 24. FIG. 5 illustrates the voltage comparator 45 and includes two 2N–697 transistors forming emitter follower input stages for the input $V_a'$ and $V_o$ signals. Two additional transistors which serve as switches receive both buffered input signals and provide the output signals on the output line 46. A positive output is provided when $V_a'$ is greater than $V_0$, and vice versa; and a zero output is provided when the two are equal. As noted earlier, this circuit prevents the integrator from being reset with a new start scan position signal ($V_a$) when such new position is the same as the last old ($V_0$) scan position.

Figure 6:
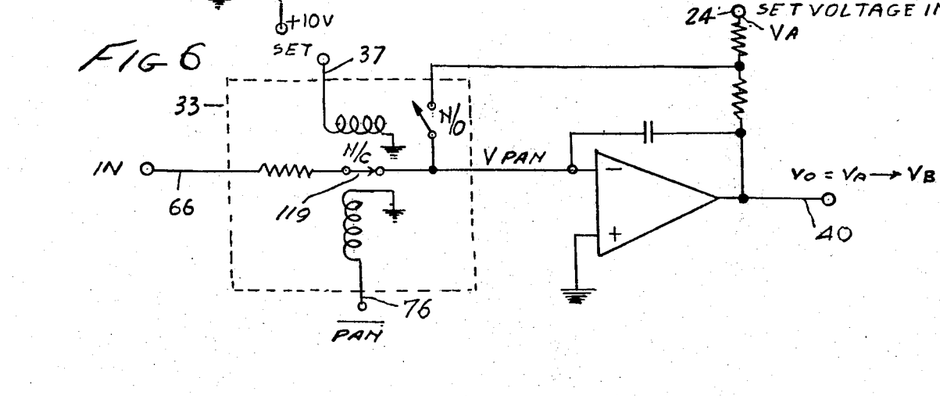
FIG. 6 is a diagram of an integrator employed in the system of FIG. 1.

FIG. 6 illustrates the integrator 34 and set an integrate relay 33. This circuit includes a conventional integrator and input control relays, the integrator amplifier typically being model PP25AU and the relay unit model SPREL manufactured by Philbrick-Nexus. The initial condition voltage $V_a$, which indicates the start scan position, is applied at 24 in a conventional manner and the initial condition is set when an energizing signal is applied to the set input line 37. A switch 119 for applying the integrand to input line 69 is normally closed for panning and is opened when energized by a not-pan input on line 76.

Figures 7A, 7B:
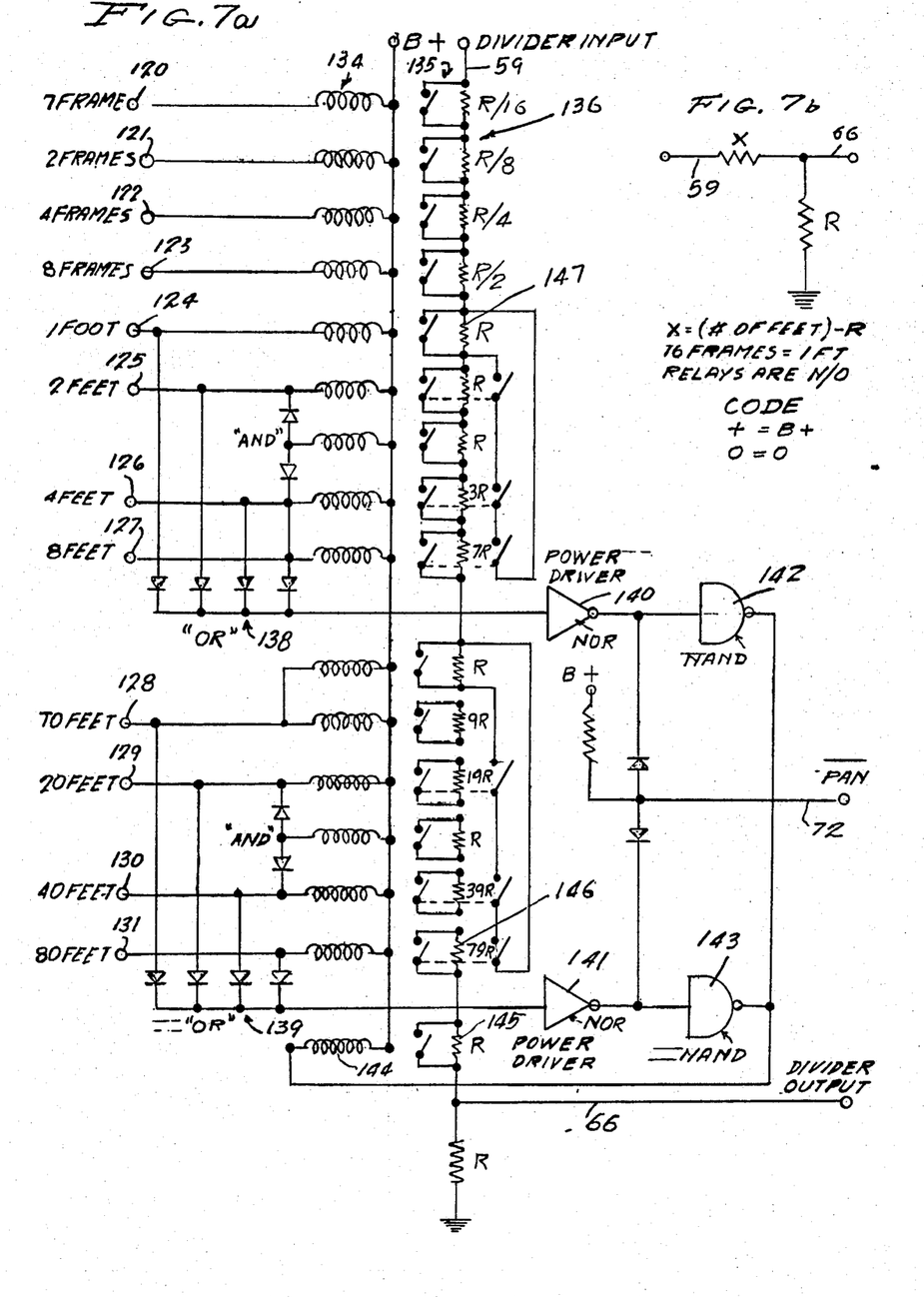
FIGS. 7a and 7b are diagrams of a digital to analog divider employed in the system of FIG. 1.

FIG. 7a illustrates the digital to analog divider 60 of FIG. 1a. The divider includes twelve input lines 120 through 131 for receiving the twelve bits from the tape reader 10 indicating pan length. Inputs 120 through 123 indicate the number of frames involved, and inputs 124 through 131 indicate the number of feet involved. Inputs 120 through 123 are in the form of a binary code indicating zero through fifteen frames; inputs 124 through 127 are in the form of a binary code indicating 0 to 9 feet; and inputs 128 through 131 are in a binary code indicating 0 to 90 feet. These input signals operate relay windings generally designated by numeral 134 which in turn operates switches generally designated 135 to select various combinations of the resistors of resistive divider 136 to provide an output on the line 66 which is a function of the pan length divided into the voltage applied by the line 59. FIG. 7b is a general equivalent circuit of the divider wherein an input voltage from the line 59 is applied through a divider, including resistance X selected by the digital inputs indicative on pan length and a fixed resistance R, to provide the analog voltage output on the line 66.

The divider in FIG. 7a further includes OR circuits 138 and 139 coupled with respective "nor" power drivers 140 and 141 which in turn are coupled with nand gates 142 and 143. The outputs of these nand gates are coupled to control the lower relay winding 144 of the group of windings 134, and the outputs of the nor circuits 140 and 141 are coupled through biased diodes to the output not-pan line 72. The lower winding 144 is used to switch in a resistor R into the divider 136 when there are input signals to any inputs 124–127 (feet) and inputs 128–131 (feet times 10). For example, if the pan is 81 feet, input signals are applied at inputs 131 and 124 thereby selecting resistors 146 and 147 (79R + R); and winding 144 selects resistor 145 (R) thereby providing a total of 81R in the divider 136.

Figure 8:
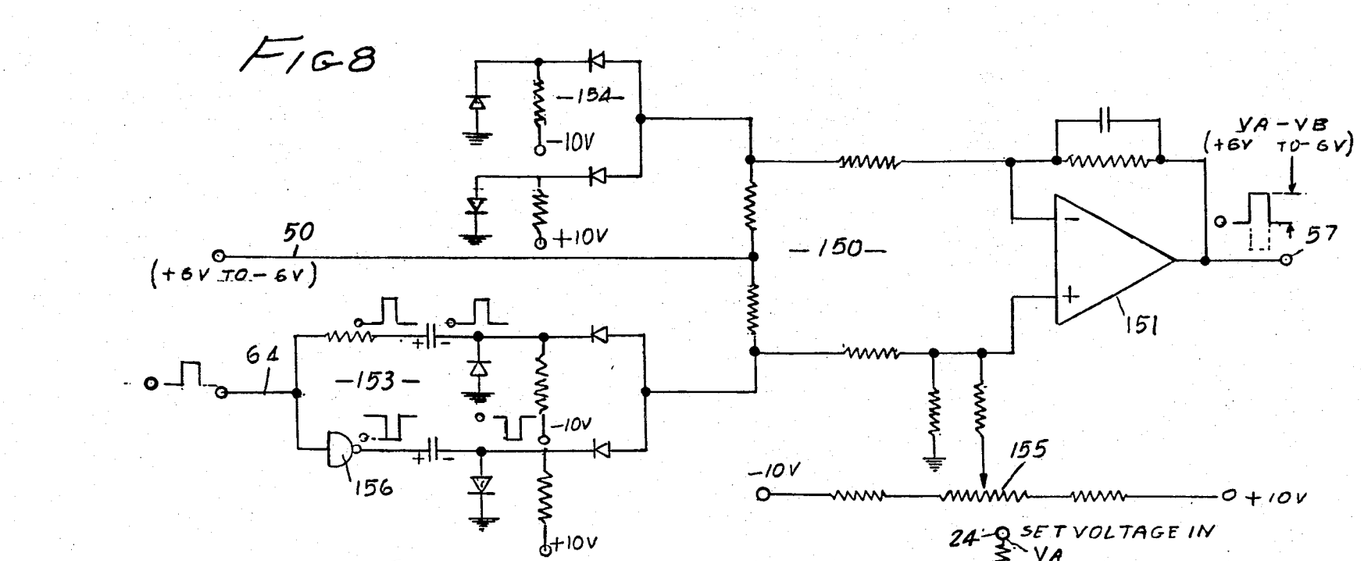
FIG. 8 is a diagram of the pulse modulator of FIG. 1b.

FIG. 8 illustrates the pulse modulator 51 of FIG. 1b employed in providing a step pan action. This circuit includes the input line 50 having applied thereto the signal $V_a - V_b$ from the differential amplifier 48 in FIG. 1b. This signal typically may be a positive or negative DC voltage ranging from plus 6 volts to minus 6 volts. The line 50 is connnected to a resistive pad 150 which in turn is connected to an operational amplifier 151. A modulator 153 receives the pulses on the line 64 and modulates the signal on the line 50. The pulses on the line 64 come from the single shot circuit 62 of FIG. 1a. The modulator 153 uses a biased diode circuit, and a similar diode circuit 154 but with no input signals is used to compensate for the offset voltages of the diodes used in the modulator 153. A balancing potentiometer 155 is provided to set the output of the amplifier 151 to zero when there is no input $V_a - V_b$ on line 50. The amplifier provides a modulated or pulsed output periodically as indicated in response to the gating input on the line 64, rather than a continuous voltage level as is the case when a smooth panning operation is selected. The nand gate 156 used in the circuit 153 also may be a S8NG nand gate, and the operational amplifier 151 may be a PP85AU Philbrick-Nexus operational amplifier.

The present embodiments of this invention are to be considered in all respects as illustrative and not restrictive, the scope of the invention being indicated by the appended claims rather than by the foregoing description, and all changes which come within the meaning and range of equivalence of the claims therefore are intended to be embraced therein.

What is claimed is:

1. An automatic control system for enabling reproduction in one aspect ratio of motion pictures of another aspect ratio wherein data representing those portions of frames to be reproduced are stored for control of the reproduction, comprising
    means responsive to said stored date for deriving and decoding information contained therein including start and end scan positions and pan length,
    storage means for storing start and end scan position information,
    first control means responsive to said start scan position information from said storage means and a pan control signal for providing an output control signal,
    reproduction means responsive to said control means for selecting the portions of said motion pictures for reproduction, and
    second control means responsive to said start and end scan position information and said pan length information for providing said pan control signal as an input to said first control means.

2. A system as in claim 1 wherein
    said stored data is in digital form, and said means responsive to said stored data comprises digital to analog conversion means for converting to analog form information indicative of the start and end scan positions for each desired scene of said motion pictures and supplying the analog information to said storage means,
    said first control means comprises integrator means, said integrator means being set to commence integration at a value proportional to said start scan position and being controlled to integrate said pan control signal for controlling the operation of said reproduction means.

3. A system as in claim 2 wherein
    said second control means includes divider means responsive to the stored data indicating pan length and responsive to an input signal which is a function of the difference between the start and end scan positions for providing said pan control signal as an integrand input to said integrator means.

4. A system as in claim 2 wherein
    said second control means includes digital to analog divider means for dividing a signal $k(V_a - V_b$ by a desired pan length signal to provide said pan control signal as an integrand input signal to said integrator means.

5. A system as in claim 2 wherein
    said second control means includes means coupled with said storage means for providing an output analog signal proportional to the difference between the start and end scan positions for causing said reproduction means to provide a smooth scan from said start to end positions.

6. A system as in claim 2 wherein
    said second control means includes means for providing an analog signal proportional to the difference between the start and end scan positions and means for modulating said analog difference signal for causing said reproduction means to provide a step-by-step scan from said start to end scan positions.

7. A system as in claim 2 wherein
    said second control means includes comparator means responsive to a new start scan position and a current scan position for causing said integrator means to commence integration at said new scan position when said current scan position equals said new start scan position.

8. A system as in claim 2 wherein
    said second control means comprises digital signal comparator means responsive to (a) the difference between start and end scan positions and (b) the difference between end and current scan positions for providing signals for controlling the application of said pan control signal to said integrator means.

9. A system as in claim 2 wherein
    said reproduction means includes movable gate means for selecting the portions of said motion pictures for reproduction, and motor means for positioning said movable gate means, said motor means being responsive to the output control signal of said first control means.

10. An automatic control system for controlling the scanning and panning in the reproduction of motion pictures of one aspect ratio for reproduction in a different aspect ratio wherein portions of said motion picture selected for reproduction and data representing portions to be reproduced are stored for control of the reproduction, comprising
    reader means responsive to the stored data for providing output digital information comprising a start scan position, and end scan position, and pan length,
    digital conversion means responsive to said start and end scan position information for providing output analog signals proportional thereto, analog storage means for storing the output of said digital conversion means and for providing analog signals representative of the start and end scan positions for a current scene, integrator means having one input coupled to receive the start scan position analog signal from said storage means and an integrand input for providing an output signal, reproduction means responsive to said output signal of said integrator means for selecting the portions of said motion pictures for reproduction, and control means responsive to the start and end scan position analog signals from said storage means and said pan length signals from said reader means for providing said integrand input to said integrator means, said control means having gating means for gating said integrand input to said integrator means and including selectable means for providing a varying integrand to achieve a smooth panning operation or for providing a pulsating integrand to cause a step-by-step panning operation by said reproduction means.

11. A system as in claim 1 wherein said second control means includes divider means.

12. A system as in claim 1 wherein said second control means includes divider means responsive to the stored data indicating pan length and responsive to an input signal which is a function of the difference between the start and end scan positions for providing said pan control signal as an integrad input to said integrator means.

13. A system as in claim 1 wherein said second control means includes digital to analog divider means for dividing a signal $k(V_a - V_b)$ by a desired pan length signal to provide said pan control signal as an integrand input signal to said integrator means.

14. A system as in claim 1 wherein said second control means includes means coupled with said storage means for providing an output analog signal proportional to the difference between the start and end scan positions for causing said reproduction means to provide a smooth scan from said start to end positions.

15. A system as in claim 1 wherein said second control means includes means for providing an analog signal proportional to the difference between the start and end scan positions and means for modulating said analog difference signal for causing said reproduction means to provide a step-by-step scan from said start to end scan positions.

16. A system as in claim 1 wherein said second control means includes comparator means responsive to a new start scan position and a current scan position for causing said integrator means to commence integration at said new scan position when said current scan position equals said new start scan position.

17. A system as in claim 1 wherein said second control means comprises digital signal comparator means responsive to (a) the difference between start and end scan positions and (b) the difference between end and current scan positions for providing signals for controlling the application of said pan control signal to said integrator means.

18. A pan-scan type control system for converting film, such as motion picture film, of one aspect ratio into a recording to provide another aspect ratio, and wherein data representing portions of frames of the film to be reproduced are stored for control of the reproduction, comprising means responsive to said stored data for deriving and decoding information contained therein including start and end scan positions and pan length, storage means for storing start and end scan position information, first control means responsive to said start scan position information from said storage means and a pan control signal for providing an output control signal varying from first to second levels as a function start and end positions, storage means responsive to said control means for selecting the portions of said motion pictures to be stored for reproduction, and second control means responsive to said first and end scan position information for providing said pan control signal as an input to said first control means.

* * * * *